(12) United States Patent
Bubb

(10) Patent No.: US 12,145,892 B2
(45) Date of Patent: Nov. 19, 2024

(54) METHODS OF MAKING PLUGGED HONEYCOMB BODIES WITH CEMENT PATTIES

(71) Applicant: CORNING INCORPORATED, Corning, NY (US)

(72) Inventor: Keith Norman Bubb, Beaver Dams, NY (US)

(73) Assignee: Corning Incorporated, Corning, NY (US)

(*) Notice: Subject to any disclaimer, the term of this patent is extended or adjusted under 35 U.S.C. 154(b) by 710 days.

(21) Appl. No.: 17/296,399

(22) PCT Filed: Nov. 15, 2019

(86) PCT No.: PCT/US2019/061580
§ 371 (c)(1),
(2) Date: May 24, 2021

(87) PCT Pub. No.: WO2020/112378
PCT Pub. Date: Jun. 4, 2020

(65) Prior Publication Data
US 2022/0033318 A1  Feb. 3, 2022

Related U.S. Application Data

(60) Provisional application No. 62/773,621, filed on Nov. 30, 2018.

(51) Int. Cl.
*C04B 38/00* (2006.01)
*B01D 46/00* (2022.01)
(Continued)

(52) U.S. Cl.
CPC ...... *C04B 38/0006* (2013.01); *B01D 46/0001* (2013.01); *B01D 46/2418* (2013.01);
(Continued)

(58) Field of Classification Search
CPC ............ B01D 46/0001; B01D 46/2418; C04B 26/285; C04B 38/0012; C04B 38/0006; B28B 11/006
See application file for complete search history.

(56) References Cited

U.S. PATENT DOCUMENTS 6,680,101 B1  1/2004  Kato
9,579,688 B2  2/2017  Bubb et al.
(Continued)

FOREIGN PATENT DOCUMENTS

CN  101060961 A  10/2007
CN  101850203 A  10/2010
(Continued)

OTHER PUBLICATIONS

International Search Report and Written Opinion of the International Searching Authority; PCT/US19/61580; Mailed Mar. 12, 2020; 9 Pages; European Patent Office.
(Continued)

*Primary Examiner* — Emmanuel S Luk
*Assistant Examiner* — Elisa H Vera
(74) *Attorney, Agent, or Firm* — Kevin M. Able

(57) ABSTRACT

A method of plugging a honeycomb body includes mixing a plugging mixture at a mixing temperature, wherein the plugging mixture comprises a plurality of inorganic particles, inorganic binder, organic binder, and water; dispensing the plugging mixture into a patty mold at a dispensing temperature; cooling the plugging mixture within the patty mold to a cooled temperature, such that a cement patty is formed; and pressing the cement patty into a plurality of channels in a honeycomb body, wherein the mixing temperature and the dispensing temperature are above a hydration point temperature of the organic binder in the plugging mixture, and the cooled temperature is below the hydration
(Continued)

point temperature of the organic binder in the plugging mixture.

19 Claims, 8 Drawing Sheets

(51) Int. Cl.
    *B01D 46/24*       (2006.01)
    *B28B 11/00*       (2006.01)
    *C04B 14/30*       (2006.01)
    *C04B 26/28*       (2006.01)
    *C04B 28/24*       (2006.01)

(52) U.S. Cl.
    CPC .......... *B28B 11/006* (2013.01); *C04B 14/303* (2013.01); *C04B 26/285* (2013.01); *C04B 28/24* (2013.01); *C04B 38/0012* (2013.01)

(56) References Cited

U.S. PATENT DOCUMENTS

| | | |
|---|---|---|
| 9,828,298 B2 | 11/2017 | Deneka et al. |
| 2006/0029769 A1 | 2/2006 | Ichikawa et al. |
| 2007/0182072 A1 | 8/2007 | Ichikawa et al. |
| 2008/0128082 A1 | 6/2008 | Masuda et al. |
| 2009/0035512 A1* | 2/2009 | Masukawa .......... C04B 38/0009 428/116 |
| 2009/0295009 A1 | 12/2009 | Brown et al. |
| 2010/0247851 A1 | 9/2010 | Miyata et al. |
| 2011/0076443 A1 | 3/2011 | Kimura et al. |
| 2017/0276042 A1* | 9/2017 | Bubb ....................... B01J 35/56 |
| 2017/0284245 A1 | 10/2017 | Suzuki et al. |

FOREIGN PATENT DOCUMENTS

| | | |
|---|---|---|
| CN | 101925560 A | 12/2010 |
| CN | 104245087 A | 12/2014 |
| GB | 1502134 A | 2/1978 |
| JP | 2001-220246 A | 8/2001 |
| WO | 2009/088078 A1 | 7/2009 |
| WO | 2014/036114 A1 | 3/2014 |

OTHER PUBLICATIONS

Chinese Patent Application No. 201980090937.3, Office Action, dated Apr. 25, 2022, 15 pages (8 pages of English Translation and 7 pages of Original Document), Chinese Patent Office.
Zhang, Xinfen, "Performance Manual of Foreign Explosives Raw Materials", Ordnance Industry Press, Nov. 1991, p. 178.
"Dow Technical Handbook—METHOCEL", 2002, 32 pages.

\* cited by examiner

METHODS OF MAKING PLUGGED HONEYCOMB BODIES WITH CEMENT PATTIES

This is a national stage application under 35 U.S.C. § 371 of International Application No. PCT/US2019/061580, filed on Nov. 15, 2019, which claims the benefit of priority under 35 U.S.C. § 119 of U.S. Provisional Application No. 62/773,621 filed on Nov. 30, 2018, the content of which is incorporated herein by reference in its entirety.

FIELD OF THE DISCLOSURE

The present disclosure relates to making plugged honeycomb bodies, and more specifically, employing cement patties in the plugging of honeycomb bodies to make particulate filters.

BACKGROUND

Various challenges exist in plugging honeycomb bodies with a cement which does not result in voids in the plugs.

SUMMARY OF THE DISCLOSURE

According to one embodiment, a method of forming a plugging cement patty comprises mixing a plugging mixture at a mixing temperature, the plugging mixture comprising a plurality of inorganic particles, an inorganic binder, an organic binder, and a liquid; dispensing the plugging mixture at a dispensing temperature; and cooling the plugging mixture to a cooled temperature to form a patty, wherein the dispensing temperature is above a hydration point temperature of the organic binder in the plugging mixture, and the cooled temperature is below the hydration point temperature of the organic binder in the plugging mixture.

According to another embodiment, a method of forming a plugging cement patty for plugging a honeycomb body comprises mixing a plugging mixture at a mixing temperature, wherein the plugging mixture comprises cordierite, colloidal silica, organic binder, and water; dispensing the plugging mixture into a patty mold at a dispensing temperature; and cooling the plugging mixture to a cooled temperature within the patty mold, wherein the cooled temperature is below a hydration point temperature of the organic binder in the plugging mixture, and the mixing temperature and the dispensing temperature are above the hydration point temperature of the organic binder in the plugging mixture.

According to yet another embodiment, a method of plugging a honeycomb body comprises mixing a plugging mixture at a mixing temperature, wherein the plugging mixture comprises a plurality of inorganic particles, inorganic binder, organic binder, and water; dispensing the plugging mixture into a patty mold at a dispensing temperature; cooling the plugging mixture within the patty mold to a cooled temperature, such that a cement patty is formed; and pressing the cement patty into a plurality of channels in a honeycomb body, wherein the mixing temperature and the dispensing temperature are above a hydration point temperature of the organic binder in the plugging mixture, and the cooled temperature is below the hydration point temperature of the organic binder in the plugging mixture.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Additional features and advantages will be set forth in the detailed description which follows and will be apparent to those skilled in the art from the description, or recognized by practicing the embodiments as described in the following description, together with the claims and appended drawings.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, a "super addition" refers to a weight percent of a component, such as for example, a binder, liquid vehicle, or pore former, based upon and relative to 100 weight percent of a plurality of inorganic particles.

Figure 1:
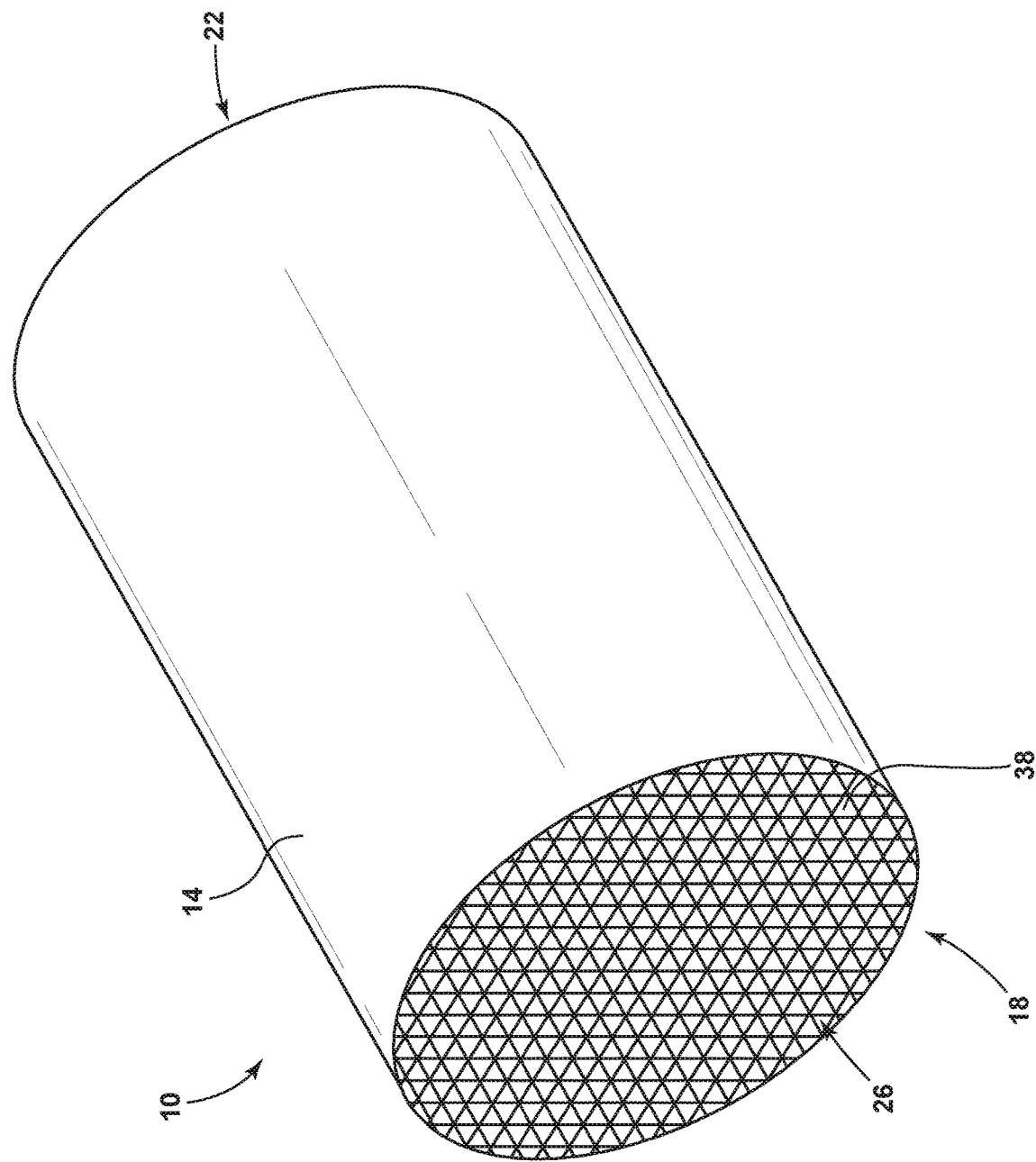
FIG. 1 is a perspective view of a honeycomb body, according to at least one example.
Figure 2:
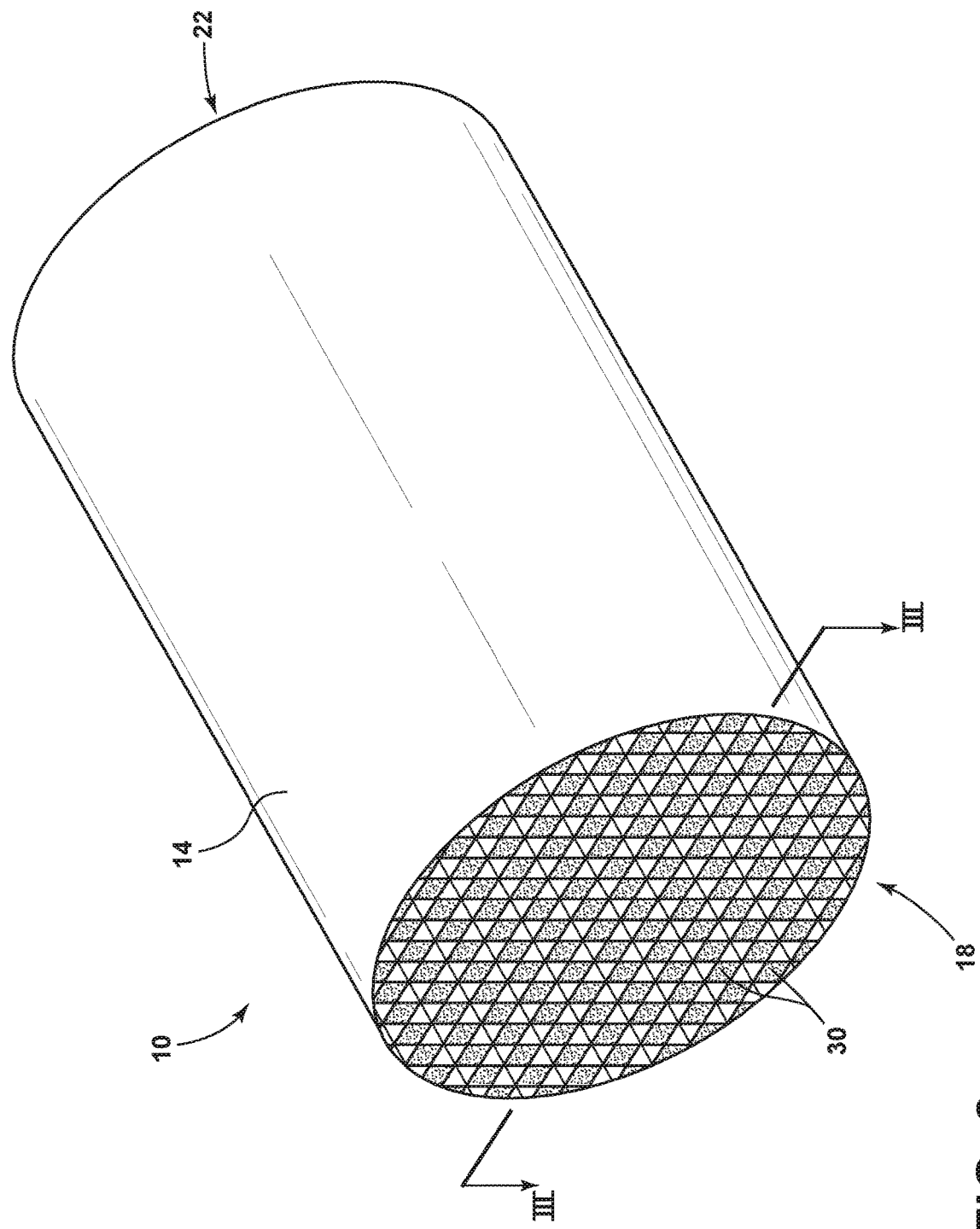
FIG. 2 is a perspective view of the honeycomb body including a plurality of plugs, according to at least one example.

FIGS. 1 and 2 show a honeycomb body 10 comprising a honeycomb structure 14 comprising a first end 18 and a second end 22. The honeycomb structure 14 comprises intersecting cell walls that form a plurality of channels 26 extending from the first end 18 to the second end 22. According to various examples, a honeycomb body 10 comprises a plurality of plugs 30 (see FIG. 2) positioned within at least some of the channels 26 (see FIG. 1), in some embodiments at first and second ends 18, 22, of the honeycomb body 14.

Referring now to FIG. 1, the honeycomb body 14 comprises a matrix of intersecting cell walls which comprise thin, porous walls 38 which extend across and between the first and second ends 18, 22 to form a large number of adjoining channels 26. The channels 26 extend between and are open at the first and second ends 18, 22 of the honeycomb structure 14. According to various examples, the channels 26 are mutually parallel with one another. The honeycomb body 14 may comprise a transverse cross-sectional channel density of from about 10 channels/in$^2$ to about 900 channels/in$^2$, from about 20 channels/in$^2$ to about 800 channels/in$^2$, from about 30 channels/in$^2$ to about 700 channels/in$^2$, from about 40 channels/in$^2$ to about 600 channels/in$^2$, from about 50 channels/in$^2$ to about 500 channels/in$^2$, from about 60 channels/in$^2$ to about 400 channels/in$^2$, from about 70 channels/in$^2$ to about 300 channels/in$^2$, from about 80 channels/in$^2$ to about 200 channels/in$^2$, from about 90 channels/in$^2$ to about 100 channels/in$^2$, from about 100 channels/in$^2$ to about 200 channels/in$^2$, or any and all values and ranges of channel density therebetween. The walls 38 may have a thickness in mils (i.e., thousands of an inch) of from about 1 mil to about 15 mils, from about 1 mil to about 14 mils, from about 1 mil to about 13 mils, or from about 1 mil to about 12 mils, from about 1 mil to about 11 mils, from about 1 mil to about 10 mils, from about 1 mil to about 9 mils, from about 1 mil to about 8 mils, from about 1 mil to about 7 mils, from about 1 mil to about 6 mils, from about 1 mil to about 5 mils, from about 1 mil to about 4 mils, from about 1 mil to about 3 mils, from about 1 mil to about 2 mils, or any and all values and ranges of thickness therebetween. It will be understood that although the channels 26 are depicted with a generally square cross-sectional shape, the channels 26 may have a circular, triangular, rectangular, pentagonal or higher order polygon cross-sectional shape without departing from the teachings provided herein.

The honeycomb body 10 may be formed of a variety of materials including ceramics, glass-ceramics, glasses, metals, and by a variety of methods depending upon the material selected. According to various examples, a green body which is transformed into the honeycomb structure 14 may be initially fabricated from plastically formable and sinterable finely divided particles of substances that yield a porous material after being fired. Suitable materials for a green body which is formed into the honeycomb structure 14 comprise metallics, ceramics, glass-ceramics, and other ceramic based mixtures. In some embodiments, the honeycomb structure 14 is comprised of a cordierite (e.g., $2MgO \cdot 2Al_2O_3 \cdot 5SiO_2$) material.

Referring to FIG. 2, the plugged honeycomb body 10 can be formed from the honeycomb structure 14 by closing or sealing a first subset of channels 26, such as at the first end 18 with plugs 30, and the remaining channels 26 (for example alternating channels 26) being closed at the second end 22 of the honeycomb structure 14, using other plugs 30. In operation of a filter comprising the plugged honeycomb body 10, fluids such as gases carrying solid particulates are brought under pressure to the inlet face (e.g., the first end 18). The gases then enter the honeycomb body 14 via the channels 26 which have an open end at the first end 18, pass through the walls 38 of the porous cell walls, and out the channels 26 which have an open end at the second end 22. Passing of the gasses through the walls 38 may allow the particulate matter in the gases to remain trapped by the walls 38.

Figure 4:
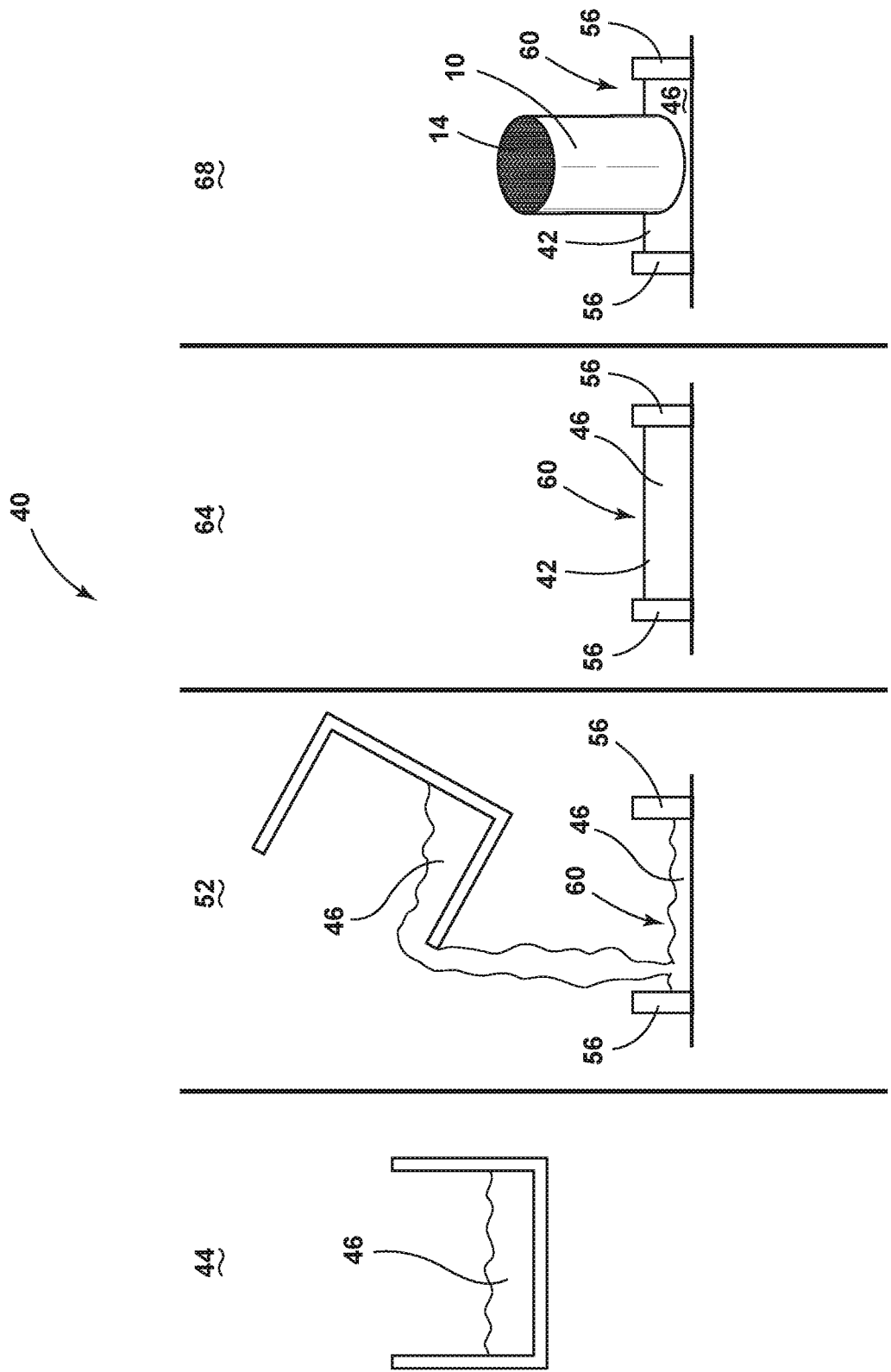
FIG. 4 is a schematic depiction of a method of forming a cement patty, according to at least one example.

As shown in FIGS. 2 and 4, the honeycomb body 10 can be formed by pressing cement patties 42 into the first end 18 and second end 22 of the honeycomb structure 14, such that a first subset of channels 26 are closed or sealed at the first end 18 by the cement patty 60, and the remaining channels 26 (for example alternating channels 26) are closed at the second end 22 of the honeycomb structure 14, another cement patty 60. The portions of the cement patties 60 that are pressed or inserted or driven or squeezed or filled into the channels 26 of the honeycomb structure 14 may be called plugs 30.

Figure 3:
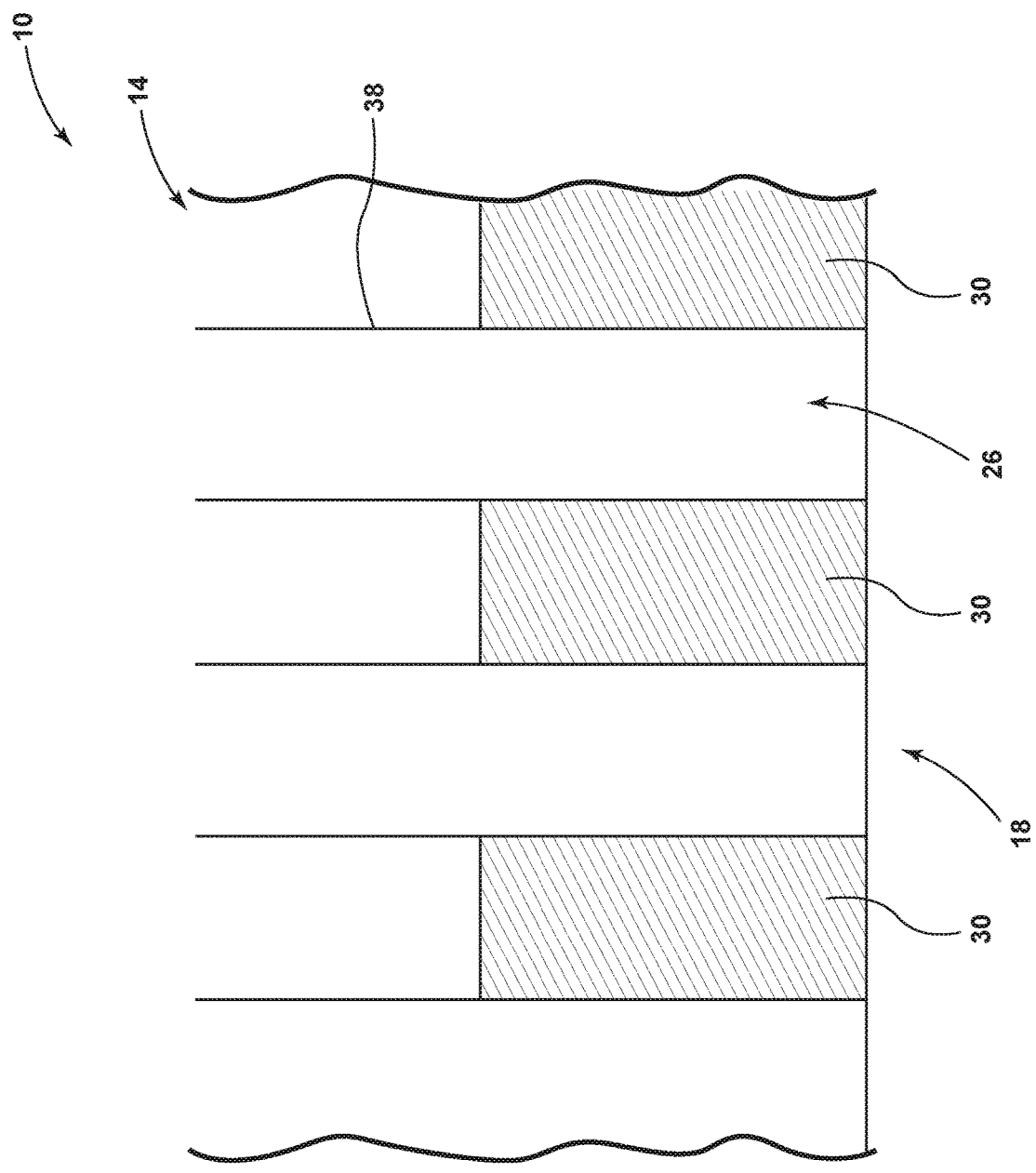
FIG. 3 is a cross-sectional view taken at line of FIG. 2, according to at least one example.

As schematically illustrated in FIGS. 2 and 3, plugs 30 may be positioned in the channels 26 in an alternating manner. In the depicted example, the plugs 30 are positioned across the first and second ends 18, 22 of the honeycomb structure 14 in a "checkerboard" pattern, but it will be understood that other patterns may also be applied. In the checkerboard pattern, each of an open channel's 26 nearest neighbor channels 26 on an end (e.g., either the first or second end 18, 22) comprises a plug 30.

The plugs 30 may have an axial length, or longest dimension extending substantially parallel with the channels 26, of about 0.5 mm or greater, of about 1 mm or greater, of about 1.5 mm or greater, of about 2 mm or greater, of about 2.5 mm or greater, of about 3 mm or greater, of about 3.5 mm or greater, of about 4 mm or greater, of about 4.5 mm or greater, of about 5 mm or greater, of about 5.5 mm or greater, of about 6.0 mm or greater, or of about 6.5 mm or greater. For example, the plugs 30 may have an axial length of from about 0.5 mm to about 10 mm, from about 1 mm to about 9 mm, from about 1 mm to about 8 mm, from about 1 mm to about 7 mm, from about 1 mm to about 6 mm, from about 1 mm to about 5 mm, from about 1 mm to about 4 mm, from about 1 mm to about 3 mm, from about 1 mm to about 2 mm, or any and all value and ranges of axial length therebetween. According to various examples, the plurality of plugs 30 located on the first end 18 of the structure 14 may have a different length than the plugs 30 positioned on the second end 22 of the body 14.

The variation in length for a plurality of plugs 30 may be expressed as a standard deviation and is calculated as the square root of variance by determining the variation between each length relative to the average length of the plugs 30. The standard deviation of the plurality of plugs 30 is a measure of the variance in the length of plugs 30 positioned, for example, on either the first or second ends 18, 22 of the honeycomb structure 14. All of the plurality of plugs 30 on one end (e.g., the first or second end 18, 22) may have a standard deviation in length of from about 0.1 mm to about 3.0 mm. For example, a standard deviation in length of the plugs 30 may be about 3.0 mm or less, about 2.9 mm or less, about 2.8 mm or less, about 2.7 mm or less, about 2.6 mm or less, about 2.5 mm or less, about 2.4 mm or less, about 2.3 mm or less, about 2.2 mm or less, about 2.1 mm or less, about 2.0 mm or less, about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1.0 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm or less, or any and all values and ranges of the standard deviation in plug length therebetween. According to various examples, the plurality of plugs 30 located on the first end 18 of the structure 14 may have a different standard deviation than the plugs 30 positioned on the second end 22 of the structure 14.

Referring now to FIG. 4, a method 40 of forming a plugging cement patty 42 and plugging the honeycomb body 10 with the plugging cement patty 42 is disclosed. The method 40 may begin with a step 44 of mixing a plugging mixture 46. The plugging mixture 46 may generally comprise a plurality of inorganic particles, an inorganic binder, an organic binder, and a liquid.

According to various examples, the plurality of inorganic particles of the plugging mixture 46 may be refractory particles. The plurality of inorganic particles may be, for example, ceramic (i.e., pre-reacted or creamed), refractory powders, glass powders, glass ceramic powders, and/or a combination thereof. Exemplary ceramed refractory particles may comprise silicon carbide, silicon nitride, cordierite, aluminum titanate, and mullite. According to various examples, the plurality of inorganic particles may comprise cordierite particles. The cordierite composition may comprise, on an oxide weight percent basis, about 51% to about 54% $SiO_2$; about 13% to about 18% MgO; and about 28% to about 35% $Al_2O_3$. Exemplary refractory glass powders can comprise crushed borosilicate glass.

In various examples, the plurality of inorganic particles of the plugging mixture 46 may have a median particle size diameter D50 less than or equal to about 100 micrometers, about 90 micrometers, about 80 micrometers, about 70 micrometers, about 60 micrometers, about 50 micrometers, about 40 micrometers, about 30 micrometers, about 20 micrometers, about 10 micrometers, or any and all median particle size diameters below the given values. For example, the plurality of inorganic particles may have a median particle size D50 in the range of from about 10 micrometers to about 100 micrometers, from about 10 micrometers to about 50 micrometers, or from about 15 micrometers to about 25 micrometers. It is contemplated that the plurality of inorganic particles of the plugging mixture 46 may have any desired median particle size D50, depending upon the desired properties for the resulting composition.

The inorganic binder of the plugging mixture 46 may comprise silica, alumina, other inorganic binders and/or a combination thereof. The silica may be in the form of fine amorphous, nonporous silica particles. For example, the inorganic binder may be generally spherical silica particles. According to various examples, the inorganic binder may comprise colloidal silica. At least one example of suitable colloidal silica for the inorganic binder of the plugging mixture 46 is produced under the name Ludox®.

According to various examples, the liquid used in the plugging mixture 46 may be water, but it will be understood that other liquids may be utilized in combination with water or as a replacement of water without departing from the teachings provided herein. The amount of the liquid component can vary in order to provide optimum handling properties and compatibility with the other components of the plugging mixture 46. According to various examples, the liquid content may be present as a super addition to the inorganic particles of the plugging mixture 46 in an amount from about 15 wt % to about 60 wt %, or from about 20 wt % to about 50 wt %. In a specific example, the liquid content may be present as a super addition in an amount of about 34 wt % by weight of the inorganic particles.

The plugging mixture 46 can optionally comprise one or more processing aids such as a plasticizer, lubricant, surfactant, sintering aid, rheology modifier, thixotropic agent, or dispersing agents. An exemplary plasticizer for use in preparing the plugging composition is glycerine. Exemplary lubricants comprise a hydrocarbon oil and/or a tall oil.

The organic binder may be present in the plugging mixture 46 as a super addition relative to the combined total weight of the cordierite in the plugging mixture in an amount of about 0.1 wt %, about 0.5 wt %, about 1.0 wt %, about 2.0 wt %, about 3.0 wt %, about 4.0 wt %, about 5.0 wt %, about 6.0 wt %, about 7.0 wt %, or any and all values and ranges between the given values. For example, the organic binder may be present in the plugging mixture 46 as a super addition in an amount in the range of from about 0.1 wt % to about 5.0 wt %, from about 0.1 wt % to about 6.0 wt %, from about 0.5 wt % to about 6.0 wt %, from about 0.5 wt % to about 6.0 wt %, from about 0.5 wt % to about 5.0 wt %, from about 0.5 wt % to about 4.0 wt %, from about 0.5 wt % to about 3.0 wt %, from about 0.5 wt % to about 2.0 wt %.

In various examples, the organic binder used in the plugging mixture 46 may be a material which changes the viscosity of the plugging mixture 46 as a function of temperature. For example, the organic binder may undergo a reversible or irreversible change in viscosity at a specific temperature or over a range of temperatures. Examples of such organic binders may comprise cellulose ethers, methylcellulose, other organic binders which exhibit the same characteristics and/or combinations thereof. At least one commercial example of an organic binder that is suitable for use in the plugging mixture 46 is produced under the name Methocel®.

According to various examples, the organic binder used in the plugging mixture 46 may have a hydration point temperature. In such examples, the organic binder, at temperatures above the hydration point temperature, is not soluble in water, while the organic binder at temperatures below the hydration point temperature tends to hydrate or, in other words, become more viscous and gel-like. The exact hydration point temperature of the organic binder may vary depending on the kind of organic binder being employed. Further, the exact hydration point temperature may vary even for the same kinds of organic binders depending on certain factors. For example, the hydration point temperature of methylcellulose may vary depending on the average number of substituted hydroxyl groups per glucose molecule of the methylcellulose. The hydration point of the organic binder may be affected by the addition of other components to the plugging mixture 46. For example, the composition and/or the quantity of the inorganic binder, processing aids and/or the inorganic particles. The hydration point temperature of the organic binder may be about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 105° C., or any and all temperatures and temperature ranges between the given values. For example, the hydration point temperature of the organic binder in the plugging mixture 46 may be from about 20° C. to about 100° C., from about 25° C. to about 60° C., or from about 30° C. to about 40° C. The variation in the hydration point temperature of certain methylcellulose organic binders in particular is exemplified in Table 1 below, which shows the hydration point temperatures of various types of Methocel® in combination with various types and amounts of additives.

TABLE 1

| Additive | wt % Additive | Methocel ® A15C (° C.) | Methocel ® F4M (° C.) | Methocel ® K4M (° C.) | Methocel ® J5M (° C.) |
|---|---|---|---|---|---|
| None | 0 | 50 | 63 | 85 | 62 |
| NaCl | 5 | 33 | 41 | 59 | 42 |
| $MgCl_2$ | 5 | 42 | 52 | 67 | 50 |
| $FeCl_2$ | 3 | 42 | 53 | 76 | 53 |
| $Na_2SO_4$ | 5 | Salted out | Salted out | Salted out | Salted out |
| $Al_2(SO_4)_2$ | 2.5 | Salted out | 45 | 48 | 41 |
| $Na_2CO_2$ | 5 | Salted out | Salted out | Salted out | Salted out |
| $Na_2PO_4$ | 2 | 32 | 42 | 52 | 43 |
| Sucrose' | 5 | 51 | 66 | 84 | 60 |
| Sucrose | 20 | 44 | 59 | 61 | 53 |
| Sorbitol | 20 | 30 | 46 | 48 | — |
| Glycerine | 20 | 34 | 60 | 65-70 | 55 |
| Ethanol' | 20 | >75 | >75 | >75 | >78 |
| Polyethylene Glycol 400' | 20 | 52 | >80 | >80 | >78 |
| Propylene Glycol' | 20 | 59 | >80 | >80 | >78 |

The transition of the organic binder within the plugging mixture 46 across the hydration point temperature may cause a shift in the viscosity of the plugging mixture 46 as the organic binder hydrates. For example, the viscosity of the plugging mixture 46 may increase when the temperature of the organic binder in the plugging mixture 46 drops below the hydration point temperature. The viscosity of the plugging mixture 46 above the hydration point temperature may be about 1 cP, about 5 cP, about 10 cP, about 15 cP, about 20 cP, about 25 cP, about 30 cP, about 35 cP, about 40 cP, about 45 cP, about 50 cP, about 55 cP, about 60 cP, about 65 cP, about 70 cP, about 75 cP, about 80 cP, about 85 cP, about 90 cP, about 95 cP, about 100 cP, about 105 cP, about 110 cP, or any and all values and ranges of viscosity between the given values. For example, the viscosity of the plugging mixture 46 above the hydration point temperature may be from about 1 cP to about 100 cP, from about 1 cP to about 75 cP, from about 1 cP to about 50 cP, from about 1 cP to about 25 cP, from about 1 cP to about 10 cP.

The viscosity of the plugging mixture 46 below the hydration point temperature may be about 1,000,000 cP, about 1,200,000 cP, about 1,400,000 cP, about 1,600,000 cP, about 1,800,000 cP, about 2,000,000 cP, about 2,200,000 cP, about 2,400,000 cP, about 2,600,000 cP, about 2,800,000 cP, about 3,000,000 cP, about 3,200,000 cP, about 3,400,000 cP, about 3,600,000 cP, about 3,800,000 cP, about 4,000,000 cP, about 4,200,000 cP, about 4,400,000 cP, about 4,600,000 cP, about 4,800,000 cP, about 5,000,000 cP, about 5,200,000 cP, about 5,400,000 cP, about 5,600,000 cP, about 5,800,000 cP, about 6,000,000 cP, about 6,200,000 cP, about 6,400,000 cP, about 6,600,000 cP, about 6,800,000 cP, about 7,000,000 cP, about 7,200,000 cP, about 7,400,000 cP, about 7,600,000 cP, about 7,800,000 cP, about 8,000,000 cP, about 8,200,000 cP, about 8,400,000 cP, about 8,600,000 cP, about 8,800,000 cP, about 9,000,000 cP, about 9,200,000 cP, about 9,400,000 cP, about 9,600,000 cP, about 9,800,000 cP, about 10,000,000 cP, about 10,200,000 cP, about 10,400,000 cP, about 10,600,000 cP, about 10,800,000 cP, or any and all values and ranges of viscosity between the given values. For example, the viscosity of the plugging mixture 46 below the hydration point temperature may be from about 1,500,000 cp to about 10,000,000, or from about 3,000,000 cP to about 5,000,000 cP.

The density of the plugging mixture 46 may increase as the temperature of the plugging mixture 46 is transitioned across the hydration point temperature. For example, the plugging mixture 46 may have a density above the hydration point temperature of about 1.40 $g/cm^3$, about 1.45 $g/cm^3$, about 1.50 $g/cm^3$, about 1.60 $g/cm^3$, about 1.65 $g/cm^3$, about 1.70 $g/cm^3$, about 1.75 $g/cm^{3'}$ or any and all values and ranges of density therebetween. The density of the plugging mixture 46 below the hydration point temperature may be about 1.70 $g/cm^3$, about 1.75 $g/cm^3$, about 1.80 $g/cm^3$, about 1.85 $g/cm^3$, about 1.90 $g/cm^3$, about 1.95 $g/cm^3$, about 2.00 $g/cm^3$, or any and all values and ranges of density therebetween.

Referring again to FIG. 4, according to various examples of the method 40, the step 44 of mixing the plugging mixture 46 comprises combining the components of the plugging mixture 46 (i.e., the liquid, the inorganic binder, the plurality of inorganic particles, and the organic binder) and then subsequently mixing the combined components together. In yet other examples, the dry components of the plugging mixture 46 (i.e., the plurality of inorganic particles) are combined and mixed together and then the wet components (i.e., the liquid) are combined and subsequently mixed with the dry components to form the plugging mixture 46.

According to various examples of the method 40, step 44 of mixing of the wet components and the dry components of the plugging mixture 46 is accomplished via vacuum mixing. In examples utilizing vacuum mixing, the plugging mixture 46 may be vacuum mixed under a pressure of less than about 101 kPa (1 Atm). For example, the pressure may be about 90 kPa or less, about 80 kPa or less, about 70 kPa or less, about 60 kPa or less, about 50 kPa or less, about 40 kPa or less, about 30 kPa or less, about 20 kPa or less, about 10 kPa, less or any and all ranges and values of pressure between the given values. Although the mixing of the plugging mixture 46 has been described in connection with a vacuum mixer, it will be understood that step 44 of mixing the plugging mixture 46 may be carried out in a variety of manners (i.e., shaken, planetary mixer, etc.) without departing from the teachings provided herein.

Step 44 of mixing the plugging mixture 46 may occur while the plugging mixture 46 is at a mixing temperature. The mixing temperature may be about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 105° C., or any and all values and ranges of temperature between the given values. According to various examples, the mixing temperature is at or above the hydration point temperature of the organic binder. In other words, the plugging mixture 46 may be at a temperature above the hydration point temperature of the organic binder in the plugging mixture 46 while the plugging mixture 46 is being combined and mixed together during step 44. As discussed above, the hydration point temperature of the organic binder may vary due to a variety of factors, comprising the presence of other components within the plugging mixture 46 that the organic binder is mixed together with. As such, it is contemplated that the mixing temperature is a temperature that is at or above the hydration point temperature of the organic binder in, and as affected by, the plugging mixture 46.

It is contemplated that step 44 of mixing the plugging mixture 46 at the mixing temperature may be accomplished in a variety of ways. In a first example, the liquid that is combined with the other components of the plugging mixture 46 may be at or above the mixing temperature when it is combined with the solid constituents of the plugging mixture 46. This may ensure the organic binder within the plugging mixture 46 is above the hydration point temperature. In another example, the entire plugging mixture 46 may be held at the mixing temperature while the components of the plugging mixture 46 are mixed together. Combining and mixing the components of the plugging mixture 46 together at the mixing temperature above the hydration point temperature may be advantageous as the organic binder may not dissolve and hydrate while the plugging mixture 46 is above the hydration point temperature. This enables the components of the plugging mixture 46 to be thoroughly mixed together while the plugging mixture 46 is at a relatively low viscosity. Such a feature may be advantageous in reducing entrained air within the plugging mixture 46 while step 44 of mixing the plugging mixture 46 is accomplished.

Referring again to the method 40 shown in FIG. 4, contemporaneously with, or after, step 44, a step 52 of dispensing the plugging mixture 46 at a dispensing temperature may be performed. Step 52 of dispensing the plugging mixture 46 may comprise casting the plugging mixture 46, pouring the plugging mixture 46, injecting the plugging mixture 46 and/or otherwise transferring the plugging mixture 46 from a mixing container, or other intermediary container, into a patty mold 56. For example, the plugging mixture 46 may be dispensed by injecting the plugging mixture 46 into the patty mold 56.

The patty mold 56 may have a cavity 60 configured to receive the dispensed plugging mixture 46. The cavity 60 may be shaped such that the plugging mixture 46 dispensed within the cavity 60 may take at least one of a host of shapes, including, but not limited to, cylindrical, ellipsoidal, pyramidal, conical, frusto-conical, cuboidal, rectanguloidal, rhomboidal, other high order polygonal, and/or a combination thereof.

The plugging mixture 46 may be dispensed into the patty mold 60 at a dispensing temperature. The dispensing temperature may be about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 105° C., or any and all values and ranges of temperature between the given values. According to various examples, the dispensing temperature is at or above the hydration point temperature of the organic binder. In other words, the plugging mixture 46 may be at a temperature above the hydration point temperature of the organic binder in the plugging mixture 46 while the plugging mixture 46 is being dispensed during step 52. As the dispensing temperature may be above the hydration point temperature of the organic binder, the plugging mixture 46 may have any of the above-noted viscosities (e.g., from about 1 cP to about 100 cP) associated with temperatures above the hydration point temperature during the step of dispensing. Such a feature may be advantageous in allowing the plugging mixture 46 to flow freely into the patty mold 56 and release any entrained gases.

Referring again to method 40 shown in FIG. 4, contemporaneously or after step 52, a step 64 of cooling the plugging mixture 46 to a cooled temperature within the patty mold 56 to form the plugging cement patty 42. The cooling of the plugging mixture 46 in the patty mold 56 and the corresponding increase in viscosity of the plugging mixture 46 may result in the formation of the plugging cement patty 42 within the cavity 60 of the mold 56. As such, the plugging cement patty 42 may take the shape of the cavity 60.

The plugging cement patty 42 may take a variety of shapes based on the shape of the patty mold 56. The plugging cement patty 42 may have a diameter, or largest cross-sectional dimension equal to or larger than a diameter or largest cross-sectional dimension of the honeycomb body 10. For example, the plugging cement patty 42 may have a diameter or longest cross-sectional dimension of about 10 cm or greater, about 20 cm or greater, about 30 cm or greater, about 40 cm or greater, about 50 cm or greater, about 60 cm or greater, about 70 cm or greater, about 80 cm or greater, about 90 cm or greater, or about 100 cm or greater. The plugging cement patty 42 may have a thickness of from about 0.5 mm to about 20 mm, from about 1 mm to about 10 mm, from about 1 mm to about 9 mm, from about 1 mm to about 8 mm, from about 1 mm to about 7 mm, from about 1 mm to about 6 mm, from about 1 mm to about 5 mm, from about 1 mm to about 4 mm, from about 1 mm to about 3 mm, or any and all value and ranges of thickness therebetween. It will be understood that the thickness of plugging cement patty 42 may vary without departing from the teachings provided herein.

According to various examples, the cooled temperature is a temperature below the hydration point temperature of the organic binder in the plugging mixture 46. As explained above, cooling the plugging mixture 46 to the cooled temperature may cause the organic binder within the plugging mixture 46 to dissolve within the liquid of the plugging mixture 46 and hydrate. This hydration of the organic binder results in the organic binder becoming gel-like and the plugging mixture 46 becoming more viscous. As such, the plugging mixture 46 and the plugging cement patty 42 at the cooled temperature may have a viscosity from about 1,500,000 cP to about 10,000,000 cP. The cooled temperature may be about 0° C., about 5° C., about 10° C., about 15° C., about 20° C., about 25° C., about 30° C., about 35° C., about 40° C., about 45° C., about 50° C., or any and all values and ranges of temperature between the given values.

According to various examples, the plugging mixture 46 may be cooled to the cooled temperature as a result of the plugging mixture 46 being dispensed into the patty mold 56, which may have a temperature below the hydration point temperature of the organic binder in the plugging mixture 46. For example, the patty mold 56 may be chilled prior to, during and/or after the plugging mixture 46 is dispensed into the patty mold 56. For example, the patty mold 56 may be composed of a metallic plate which is chilled to below the hydration point temperature (e.g., to about 0° C.) and the cavity 60 is a cylinder having a height of 3 mm. When the plugging mixture 46 is introduced into the chilled patty mold 56, the temperature of the plugging mixture 46 decreases quickly (e.g., in less than about a minute). Although step 64 was described in connection with a chilled patty mold 56, it will be understood that the patty mold 56 may be cooled in a variety of different manners (e.g., cooling bath, piezoelectric equipment, etc.) over a variety of periods of time (e.g., up to an hour). As such, the step of cooling the plugging mixture 46 to the cooled temperature may further comprise the step of subjecting the plugging mixture 46 to a cooling bath set at a temperature at or below the cooled temperature.

Once the plugging cement patty 42 formed in step 64 is produced, a step 68 of pressing the plugging cement patty 42 into the plurality of channels 26 (FIG. 3) in the honeycomb structure 14 may be performed. According to various examples, the plugging cement patty 42 is pressed into the channels 26 in the honeycomb structure 14 by pressing the honeycomb body 10 into the plugging cement patty 42 such that the plugging cement patty 42 is forced into the channels 26 of the honeycomb structure 14. Additionally or alternatively, the plugging cement patty 42 may be pressed into the channels 26 by pressing the plugging cement patty 42 into the honeycomb body 10 such that the cement patty 42 is forced into the channels 26 of the honeycomb structure 14. According to various examples, the plugging cement patty 42 may be pressed into the channels 26 in the honeycomb body 10 while the plugging cement patty 42 is within the patty mold 56. In yet other examples, the plugging cement patty 42 may be pressed into the channels 26 in the honeycomb body 10 after the plugging cement patty 42 has been removed from the patty mold 56. Pressing the plugging cement patty 42 into the plurality of channels 26 in the honeycomb body 10 may occur while the plugging mixture 46 of the plugging cement patty 42 is at the cooled temperature and therefore has an increased viscosity. It is, however, contemplated that the plugging cement patty 42 may be pressed into the plurality of channels 26 in the honeycomb body 10 while the plugging mixture 46 of the plugging cement patty 42 is at a temperature above the hydration point temperature of the organic binder in the plugging mixture 46 and/or while the plugging mixture 46 is at the mixing temperature and/or the dispensing temperature. According to various examples, the honeycomb body 10 may have a mask layer defining a plurality of holes aligned with the channels 26 applied thereto. For example, the mask layer may be attached to the end of the honeycomb body 10 which contacts the plugging mixture 46 such that the holes allow the plugging mixture 46 to enter the channels 26.

After step 68, the honeycomb body 10, comprising the plugging mixture 46 in the channel 26, may be fired or cured at an elevated temperature such that the plugging mixture 46 is set or transformed into the plugs 30.

Use of the present disclosure may provide a variety of advantages. First, mixing the plugging mixture 46 at the mixing temperature may allow the organic binder of the plugging mixture 46 to thoroughly and easily mix within the plugging mixture 46. Conventional processes which mix binders having temperature dependent rheological properties often suffer from the binder prematurely gelling and non-homogenously being distributed. By performing step 44 at the mixing temperature above the hydration point temperature of the organic binder, the low viscosity of the plugging mixture 46 allows the organic binder to be homogeneously distributed in the plugging mixture 46.

Second, dispensing the plugging mixture 46 at the dispensing temperature may enable the plugging mixture 46 to flow readily into the patty mold 56 and self-level therein. Conventional formation of cement bodies is often hindered by the high viscosity of the cement which tends to resist freely flowing into cavities. The high viscosity may prevent the cement from taking the desired shape as well as result in the entrainment of air as the cement is transferred into a form. In the present disclosure, as the dispensing temperature is at or above the hydration point temperature, the organic binder will not have been dissolved or hydrated and therefore the plugging mixture 46 will flow freely in the cavity 60 with a low viscosity.

Third, as the dispensing temperature affords the plugging mixture 46 a low viscosity as it enters the patty mold 56, the plugging mixture 46 tends to self-level within the cavity 60. Conventional methods of forming cement structures may suffer from an inability to produce a smooth level surface into which particulate filters may be inserted, leading to inhomogeneous blockages formed therefrom. By dispensing the plugging mixture 46 into the cavity 60 at the dispensing temperature, the plugging mixture 46 may self-level as well as allow any entrained air to escape. Such a feature may be advantageous in forming a substantially smooth surface on the top of the plugging mixture 46 for the honeycomb body 10 to be inserted into.

Fourth, the minimal amount of entrapped air in plugging mixture 46 reduces the number of air pockets in the plugging cement patties 42 and therefore decreases the variability in length or depth of the plugs 30. In conventional designs, air pockets in plugging cement can lead to discontinuities in blockages formed in particulate filters do to there being a lack of cement to fully fill the particulate filter. Use of the mixing temperature and the dispensing temperature, each of which are at or above the hydration point temperature of the organic binder, minimizes the amount of entrained air and thereby reduces and/or eliminates areas where the plugs 30 may have variability in depth.

EXAMPLES

Provided below are comparative examples and non-limiting examples of the present disclosure.

Figure 5:
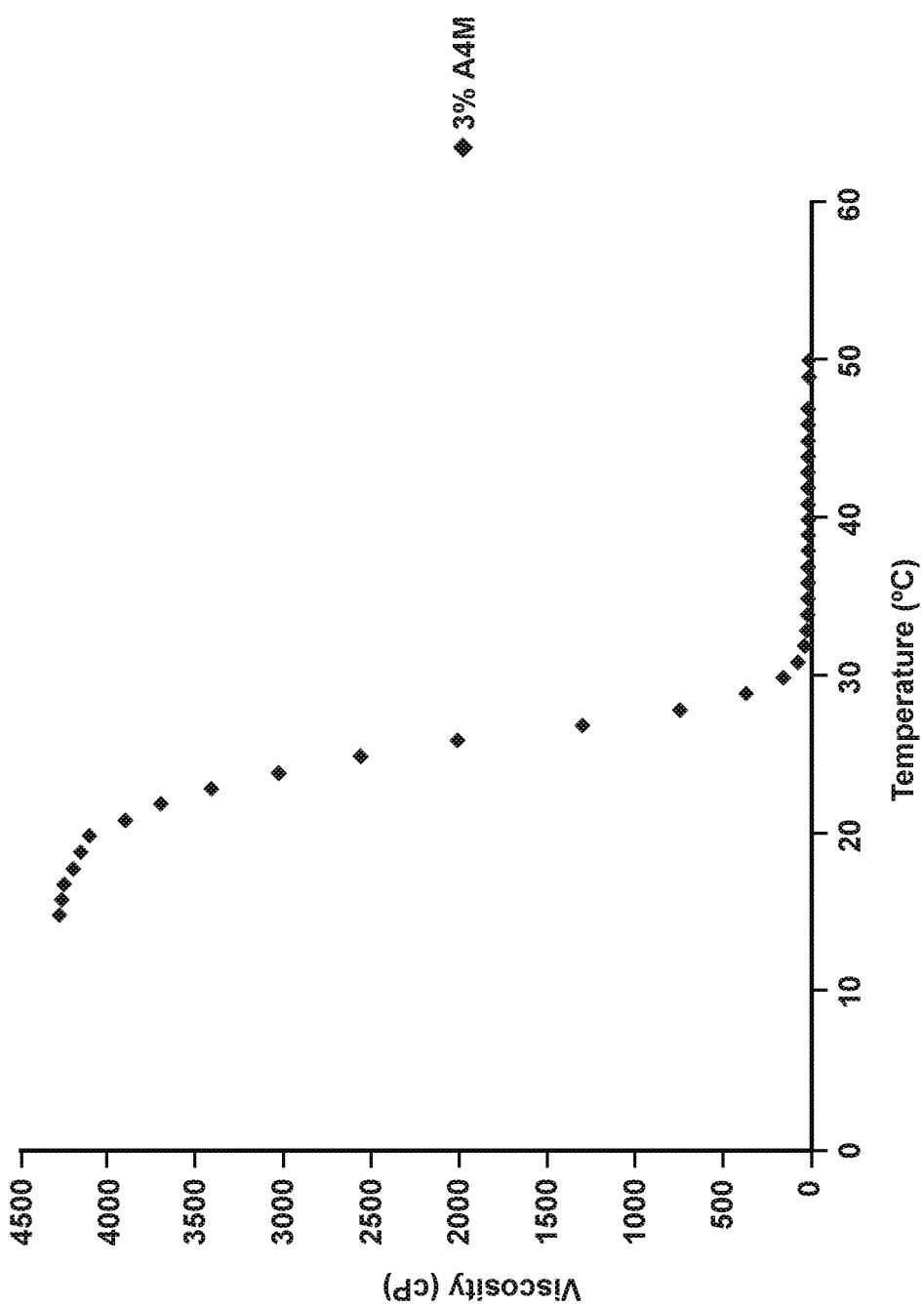
FIG. 5 is a viscosity vs. temperature graph for a mixture of 3 wt % methylcellulose (Methocel® A4M) in water.

Referring now to FIG. 5, provided is a viscosity curve (i.e., viscosity) vs. temperature (° C.) of a water and methylcellulose (e.g., the organic binder) mixture (e.g., the plugging cement 46). The methylcellulose was Methocel® A4M. The mixture had a 3 wt % methylcellulose concentration. As can be seen from FIG. 5, the hydration point temperature of the mixture is approximately 25° C. and the mixture undergoes a dramatic viscosity increase as the temperature of the mixture drops below the hydration point temperature. It will be understood that additional solids in the mixture may raise the beginning or final viscosity of the mixture to levels greater than that shown in FIG. 5 for a methylcellulose in water mixture.

Figure 6:
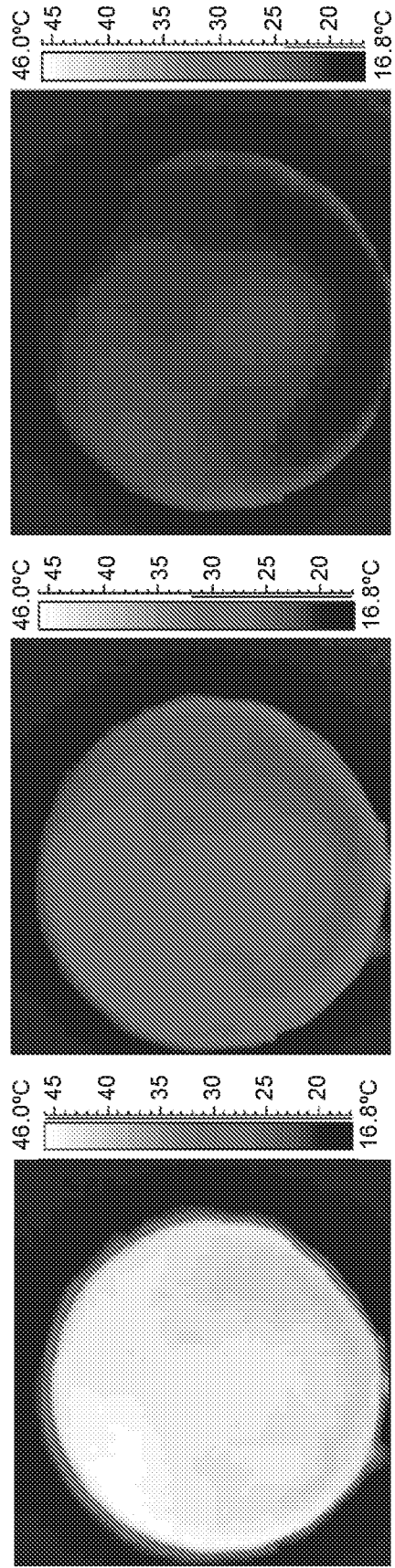
FIG. 6A is a grayscale image of the initial temperature of a cement patty that was poured onto a 0° C. patty mold.
FIG. 6B is a grayscale image of the temperature of the cement patty that was poured onto a 0° C. patty mold after 10 seconds.
FIG. 6C is a grayscale image of the temperature of the cement patty that was poured onto a 0° C. patty mold after 20 seconds.

Referring now to FIGS. 6A-6C, depicted are thermal images of a patty (e.g., the plugging cement patty 42) containing methylcellulose in a forming (e.g., the mold 56) as it transitions from a pouring temperature (e.g., the dispensing temperature) to a form temperature (e.g., the cooled temperature). FIG. 6A is taken at 0 seconds after being poured, FIG. 6B is taken at 10 seconds after being poured and FIG. 6C is taken after 20 seconds of being poured. The form was a 7 mm thick aluminum collared plate chilled to 0° C. and the patty was a cylinder having a height of 3 mm. The patty was cooled uniformly from 46° C. to approximately 20° C. in about 20 seconds. The change in temperature was sufficient to pass the hydration point temperature of the methylcellulose and increase the viscosity of the patty.

Figure 7:
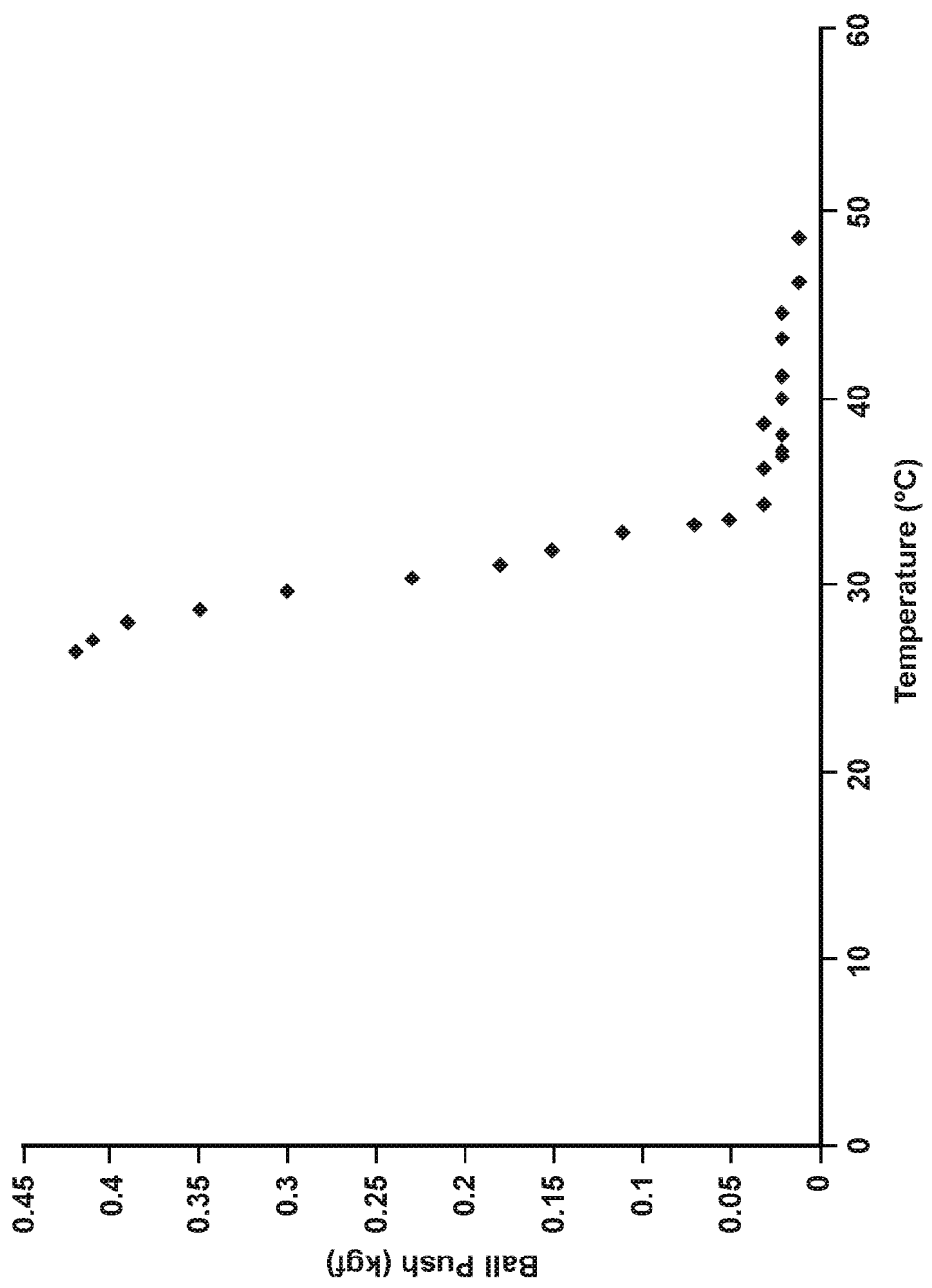
FIG. 7 is a graph of ball push force vs. temperature for a mixture of 3 wt % methylcellulose (Methocel® A4M) in water.

Referring now to FIG. 7, provided is a graph of ball push force (kgf) vs. temperature (° C.) of a patty formed consistent with the present disclosure. As the material of the patty is transitioned to a temperature below the hydration point temperature (i.e., 35° C. for this patty), the force required to indent the patty with a ball push indenter increases above 0.05 kg as a result of the mixture of the patty thickening and increasing in viscosity.

Known processes for selectively forming blockages in honeycomb shaped particulate filters use high viscosity plugging cement, e.g., is applied in a patty to the end of a honeycomb body, but in such processes, the constituents of the plugging cement are mixed while the viscosity of the plugging cement is high (e.g., >1,000,000 cP) which often entrains gasses (e.g., air) in the plugging cement, and as a result of the mixing under high viscosity conditions, the plugging cement can includes a variety of voids or air pockets, and such plugging cement is then introduced into the honeycomb body forming the plugged honeycomb body for a particulate filter. In such cases, the voids and air pockets in the plugging cement within a filter can result in non-uniform blockage depth or plug depth or seal depth, as well as low plugging pressures that can cause additional voids and dimples to form, slow plugging rates, or batch non-uniformity. Further, high viscosity of known plugging cement can make it difficult to consistently form a thin, uniform patty of the cement without air bubbles.

Figure 8B:
FIG. 8B is a perspective view of an example of a cement patty according, to the disclosure, as formed consistent with a method of the present disclosure.
Figure 8A:
FIG. 8A is a perspective view of a comparative example of a cement patty.

Referring now to FIG. 8A, provided is a comparative example of a patty formed via a conventional cement manufacturing process. The patty exhibits a number of pores and voids at its upper surface where entrained gas ultimately escaped. Further, the patty contains a number of gas voids within the body of the patty. Use of the patty for forming plugged honeycomb body for a particulate filter (e.g., the honeycomb body 10) would result in conduits (e.g., the channels 26) of the particulate filter proximate the voids and pores not being appropriately filled.

Referring now to FIG. 8B, provided is an example of the present disclosure. The patty is formed of a mixture (e.g., the plugging mixture 46) that comprises a binder (e.g., the organic binder). The mixture was mixed and dispensed into the form at a temperature above the hydration point temperature of the binder and chilled to below the hydration point temperature in the form. As can be seen, the patty exhibits a smooth surface largely free of voids and pores due to the reduced amount of entrained gases which must escape relative to the comparative example of FIG. 8A. Particulate filters formed using the example of FIG. 8B are expected to have a high degree of uniformity due to the uniform surface of the patty.

Known processes for selectively forming blockages in honeycomb shaped particulate filters use high viscosity plugging cement, e.g., is applied in a patty to the end of a honeycomb body, but in such processes, the constituents of the plugging cement are mixed while the viscosity of the plugging cement is high (e.g., >1,000,000 cP) which often entrains gasses (e.g., air) in the plugging cement, and as a result of the mixing under high viscosity conditions, the plugging cement can includes a variety of voids or air pockets, and such plugging cement is then introduced into the honeycomb body forming the plugged honeycomb body for a particulate filter. In such cases, the voids and air pockets in the plugging cement within a honeycomb body can result in non-uniform blockage depth or plug depth or seal depth, as well as low plugging pressures that can cause additional voids and dimples to form, slow plugging rates, or batch non-uniformity. Further, high viscosity of known plugging cement can makes it difficult to consistently form a thin, uniform patty of the cement without air bubbles.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

What is claimed is:

1. A method of forming a plugging cement patty, comprising:
   mixing a plurality of inorganic particles, an inorganic binder, an organic binder, and a liquid at a mixing temperature greater than a hydration point temperature of the organic binder to form a plugging mixture comprising a viscosity in a range from about 1 cP to about 100 cP;
   dispensing the plugging mixture at a dispensing temperature greater than the hydration point temperature; and
   cooling the plugging mixture to a cooled temperature less than the hydration point temperature to increase the viscosity of the plugging mixture and form the plugging cement patty.

2. The method of claim 1, wherein a viscosity of the plugging mixture at the cooled temperature is from about 1,500,000 cP to about 10,000,000 cP.

3. The method of claim 1, wherein a viscosity of the plugging mixture at the cooled temperature is from about 3,000,000 cP to about 5,000,000 cP.

4. The method of claim 1, wherein the organic binder comprises methylcellulose.

5. The method of claim 4, wherein the plurality of inorganic particles comprises cordierite.

6. The method of claim 5, wherein the inorganic binder comprises colloidal silica.

7. The method of claim 1, wherein the mixing comprises subjecting the plugging mixture to a pressure less than 1 atmosphere during the mixing.

8. The method of claim 1, wherein the mixing comprises bringing the liquid to the mixing temperature prior to mixing the plurality of inorganic particles, the inorganic binder, and the organic binder with the liquid.

9. A method of forming a plugging cement patty for plugging a honeycomb body, comprising the steps of:
   mixing a plugging mixture comprising cordierite, colloidal silica, organic binder, and water at a mixing temperature greater than a hydration point temperature of the organic binder such that a viscosity of the plugging mixture at the mixing temperature is in a range from about 1 cP to about 100 cP;
   dispensing the plugging mixture into a patty mold at a dispensing temperature greater than the hydration point temperature of the organic binder such that the viscosity of the plugging mixture at the dispensing temperature is in the range from about 1 cP to about 100 cP; and
   cooling the plugging mixture within the patty mold to a cooled temperature less than the hydration point temperature of the organic binder to increase a viscosity of the plugging mixture and form the plugging cement patty.

10. The method of claim 9, wherein a weight percentage of the organic binder as a super addition relative to a combined total weight of the cordierite in the plugging mixture is from about 0.5 wt. % to about 6 wt. %.

11. The method of claim 9, wherein the weight percentage of the organic binder as a super addition relative to the combined total weight of the cordierite in the plugging mixture is from about 0.75 wt. % to about 3.0 wt. %.

12. The method of claim 9, wherein the weight percentage of the organic binder as a super addition relative to the combined total weight of the cordierite in the plugging mixture is about 1.5 wt. %.

13. The method of claim 9, wherein the organic binder comprises methylcellulose.

14. The method of claim 9, wherein the step of cooling the plugging mixture to the cooled temperature further comprises the step of subjecting the plugging mixture to a cooling bath having a temperature below the cooled temperature.

15. The method of claim 9, wherein a viscosity of the plugging mixture at the cooled temperature is from about 3,000,000 cP to about 5,000,000 cP.

16. A method of plugging a honeycomb body comprising the steps of:
mixing a plugging mixture comprising a plurality of inorganic particles, an inorganic binder, an organic binder, and water at a mixing temperature greater than a hydration point temperature of the organic binder such that a viscosity of the plugging mixture is in a range from about 1 cP to about 100 cP;
dispensing the plugging mixture into a patty mold at a dispensing temperature greater than the hydration point temperature of the organic binder;
cooling the plugging mixture within the patty mold to a cooled temperature below the hydration point temperature to increase a viscosity of the plugging mixture and form a plugging cement patty, the cooling comprising cooling the patty mold to the cooled temperature prior to the dispensing; and
pressing the plugging cement patty into a plurality of channels in the honeycomb body.

17. The method of claim 16, wherein the hydration point temperature of the organic binder in the plugging mixture is from about 20° C. to about 100° C.

18. The method of claim 16, wherein the hydration point temperature of the organic binder in the plugging mixture is from about 25° C. to about 60° C.

19. The method of claim 16, wherein the organic binder comprises methylcellulose.

* * * * *